Oct. 31, 1933.  L. BENOIT  1,932,721
CASE FOR EGGS
Filed Sept. 13, 1930
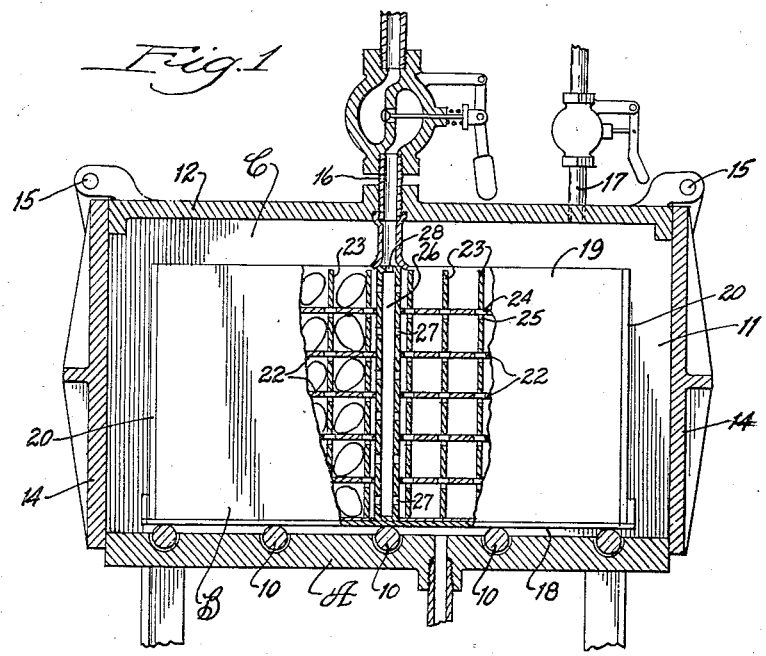
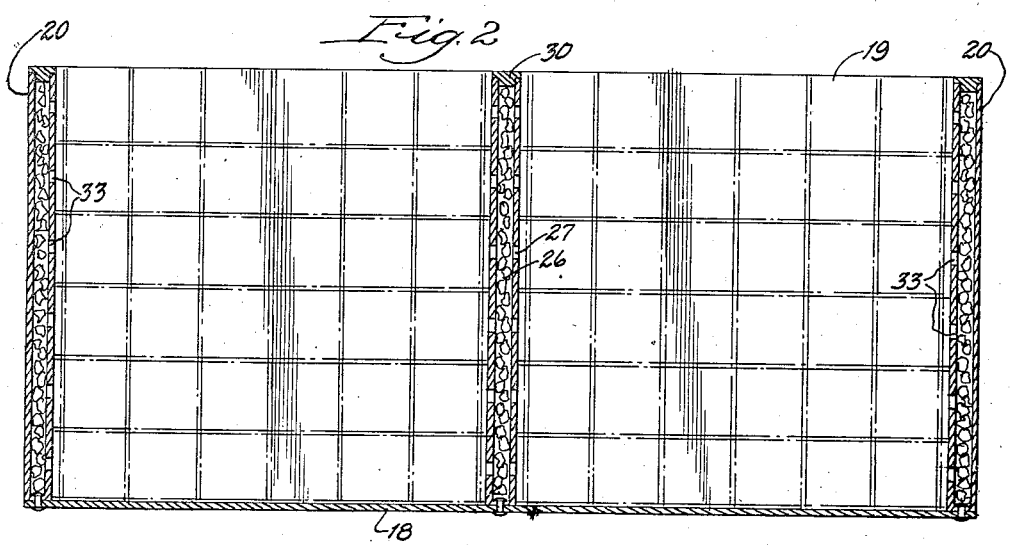
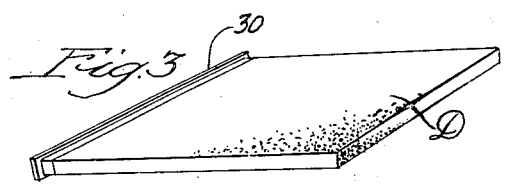
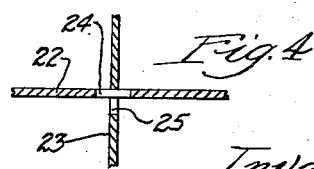
Inventor:
Leon Benoit,
By Danning & Danning
Attys.

Patented Oct. 31, 1933

1,932,721

UNITED STATES PATENT OFFICE 1,932,721

CASE FOR EGGS

Leon Benoit, Chicago, Ill.

Application Septemper 13, 1930
Serial No. 481,676

2 Claims. (Cl. 99—2)

This invention is concerned with a case in which eggs or other like commodities may be packed for purposes of shipment, storage, treatment, etc. The features of improvement have to do with the provision of chambered walls in communication with the interior of the case at divers places, whereby an agent for preserving, treating, refrigerating, or other purpose, may act upon all the eggs or other commodities which are contained within the case. Some of the features characterizing this invention have already been disclosed in my application filed December 29, 1928 under Serial No. 329,218.

Certain suggestive embodiments of my invention are illustrated in the accompanying drawing in the manner following—

Figure 1 is a vertical section through a treating chamber containing an egg case which is shown partly in elevation and partly in section;

Fig. 2 is a vertical longitudinal section through an egg case of slightly modified construction;

Fig. 3 is a perspective view of a treating cartridge adapted to be received within one of the chambered walls of the case; and Fig. 4 is an enlarged detail in section showing the juncture of a flat with adjacent filler walls, the construction being designed to provide intercommunication between the cells.

Referring to Fig. 1, I have shown a bed A equipped with rollers 10 for slidingly supporting a case B containing eggs or other commodities to be treated. A chamber for treating the eggs is provided in conjuction with the bed, and, as shown, this comprises a hood C having opposite side walls 11, a top 12, and end doors 14 which may be hinged at 15, or otherwise connected to move to open and closed positions. When closed, as shown in the drawing, the chamber is substantially air-tight. Valved connections 16 and 17 may lead to a source of minus pressure, steam supply, etc., so that an operator may produce in the chamber desired conditions of vapor, suction, etc.

The case B containing the eggs or other commodities is constructed with the usual bottom, sides and ends 18, 19 and 20, respectively. Within the case is arranged a cellular structure, the same consisting of a plurality of superposed flats 22 with intervening filler walls 23 arranged in intersecting relation. The flats and fillers are preferably formed of sheet metal or other material which will withstand the effect of steam, moisture, etc., and provision is made for intercommunication between the cells by means of openings 24 in the flats, and also, if desired, by other openings 25 between the fillers. In addition, I provide centrally in the case, a transverse vertical partition 26 which is hollow, there being formed through the walls of this partition openings 27 opposite the several rows of eggs between the flats. The upper end of this hollow partition may further be provided with one or more inlet openings 28 in connection with the valved pipe 16 leading to the chamber. By this arrangement, when steam or vapor is admitted through such connection, it will be conducted through the hollow partition in the center of the case for distribution through all the cells therewithin.

The case just described is adapted for use in a treating chamber, or may receive within its hollow center wall a refrigerant for the purpose of maintaining all the eggs in the case at a low temperature. This refrigerant may be of any approved kind, and be introduced in loose or solid form. As an example of the latter, I have suggested in Fig. 3 a cartridge D which is receivable within the hollow partition for the dissemination of cooling units through the openings on opposite sides thereof. As indicated, the cartridge carries at its upper edge a head 30 which overlies the entrance to the hollow partition, whereby to effectively close the same when the cartridge is introduced in place.

The provision of a hollow central partition having communication with all the cells in the case is useful in various ways, as, for example, for purposes of treating, preserving, cooling, etc. An extension of this idea is suggested in Fig. 2, where I have shown the ends 20 as also constructed hollow with inner walls having openings 33 in communication with the interior of the case in the same way as the openings 27 of the central partition. It is optional where and how many of the case walls and partitions should be hollowed to provide chambers of the kind described.

In use, the present case may receive eggs placed individually in filler intercommunicating cells. If the eggs are produced from a source which is cool, the case receiving them may be maintained cool by the use of a refrigerant in the manner suggested. They remain in this condition during shipment to the point of distribution. This is of advantage as the maintenance of an even temperature condition is conducive to an improved product.

I claim:

1. An egg conditioning case having walls forming a bottom, sides, and ends, one wall being characterized by closely spaced wall portions one portion of which is perforated and said wall portions providing a narrow intermediate passageway communicating with said perforations, the upper portion of said passageway being constructed to cooperate with connections leading to a conditioning apparatus, there being perforated flats and fillers in the case between the walls forming egg receiving cells, whereby the influence of a medium from the apparatus will be distributed through the perforations of the passageway into the cells, said passageway serving also to receive a refrigerant subsequent to a conditioning operation.

2. An egg conditioning case having walls forming a bottom, sides and ends, each end characterized by spaced walls, the inner ones being perforated for the reception of a refrigerant, and spaced perforated walls forming a narrow passageway intermediate the ends, the upper portion of said passageway being constructed to cooperate with connections leading to a conditioning apparatus, there being perforated flats and fillers in the case forming egg receiving cells, whereby the influence of a medium from the apparatus will be distributed through the perforations of the passageway into the cells, said passageway serving also to receive a refrigerant subsequent to a conditioning operation.

LEON BENOIT.